E. C. SHILLING.
SAFETY DEVICE FOR AUTOMOBILES.
APPLICATION FILED NOV. 13, 1916.
1,231,531.
Patented June 26, 1917.
2 SHEETS—SHEET 1.
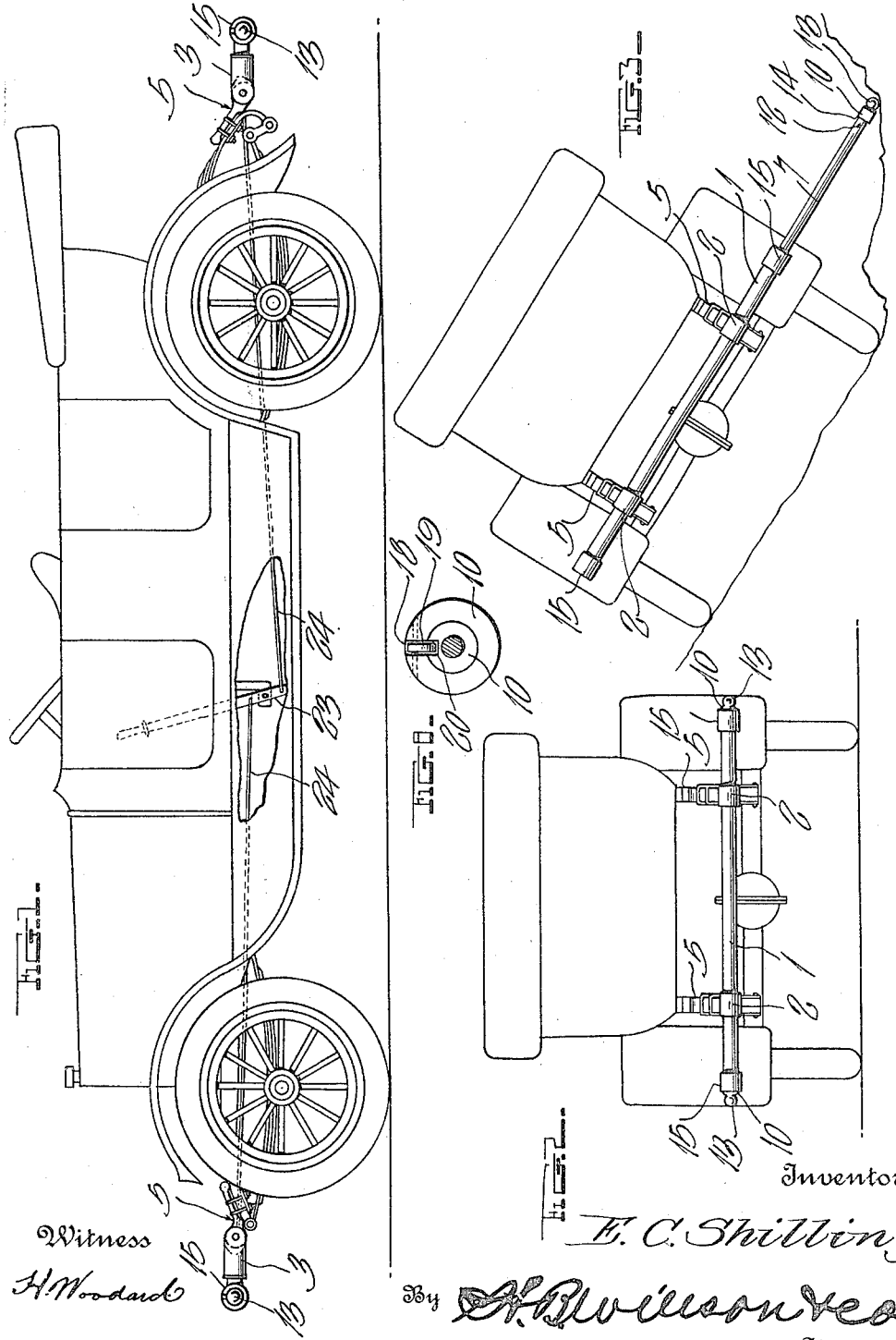
Witness
H. Woodard
Inventor
E. C. Shilling
By H. B. Willson &co.
Attorneys

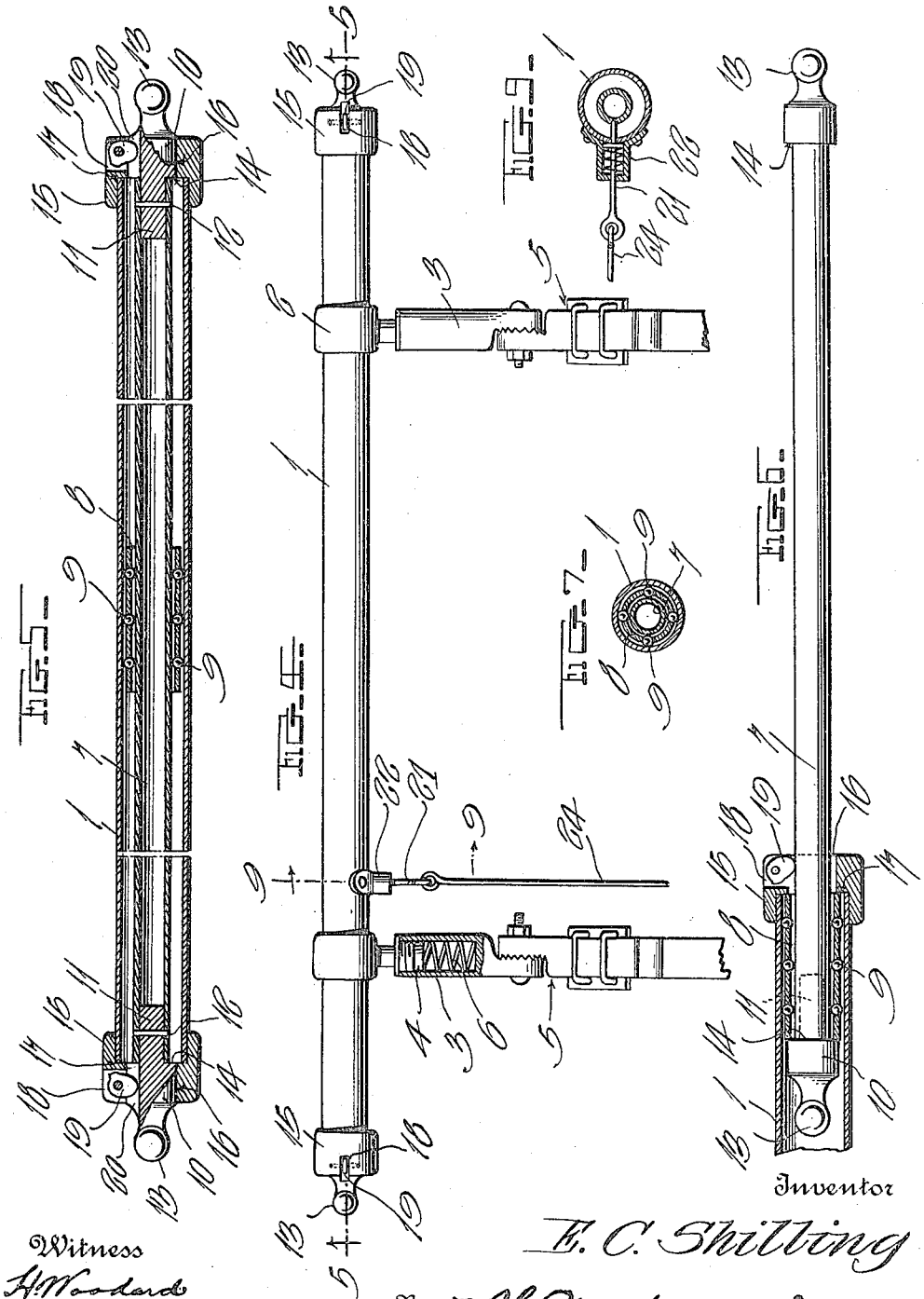

UNITED STATES PATENT OFFICE.

EDWARD C. SHILLING, OF COLUMBUS, OHIO, ASSIGNOR OF ONE-HALF TO JACOB DAGGER, OF URBANA, OHIO.

SAFETY DEVICE FOR AUTOMOBILES.

1,231,531.  Specification of Letters Patent.  Patented June 26, 1917.

Application filed November 13, 1916. Serial No. 131,109.

*To all whom it may concern:*

Be it known that I, EDWARD C. SHILLING, a citizen of the United States, residing at Columbus, in the county of Franklin and State of Ohio, have invented certain new and useful Improvements in Safety Devices for Automobiles; and I do declare the following to be a full, clear, and exact description of the invention, such as will enable others skilled in the art to which it appertains to make and use the same.

This invention relates to improvements in safety devices to be used on automobiles and similar vehicles to prevent the same from turning over when falling into a ditch or the like.

The primary object of the present invention is to improve upon the structure of the safety device shown in my United States Patent #1,146,355, dated July 13, 1915.

An additional object is to provide a very simply constructed device which can be manufactured comparatively cheap and yet which will be very efficient in operation.

With these and many other objects in view, my invention resides in the novel features of construction, combination and arrangement of parts which will be hereinafter more particularly described and claimed and shown in the drawings wherein:

Figure 1 is a side elevation partly broken away of an automobile equipped with my invention;

Fig. 2 is an end view of a vehicle showing more particularly the position of one of the safety devices on the rear thereof;

Fig. 3 is a similar view showing the safety device in operative position;

Fig. 4 is a plan view of one of the safety devices;

Fig. 5 is a vertical longitudinal section on the line 5—5 of Fig. 4;

Fig. 6 is a detail vertical section of one end of one of the safety devices, the inner part thereof being in operative position;

Fig. 7 is a vertical transverse section through the inner and outer members of the bearing sleeve disposed therebetween;

Fig. 8 is an end view partly in section of one of the devices; and

Fig. 9 is a transverse section on the line 9—9 of Fig. 4.

In carrying out the objects of my invention, I provide the front and rear ends of an automobile with safety devices having the appearance of the ordinary bumper bars, said bars being attached to the frame of the vehicle in any preferred manner. These bars are equipped with extensible members which may be quickly thrown into operation when the driver of the vehicle believes that the same is in danger of overturning.

Since both of the devices used on the front and rear of the machine are similarly constructed, only one will be hereinafter particularly described. Each consists of a preferably cylindrical tubular member 1 having sleeves 2 shrunk thereon or otherwise secured thereto at points spaced from the ends, each of said sleeves carrying a plunger 4 which is disposed in the casing 3. The casings are adjustably connected to suitable brackets 5 which are mounted upon the vehicle frame. In order that the bar 1 may act as a bumper to absorb the shocks occasioned by the machine striking an obstruction, heavy coiled springs 6 are disposed in the casing 3, the plungers 4 engaging said springs. This construction forms no part of the present invention and may be made in any desired manner.

Within the tubular member 1 is disposed a second tubular member 7 of substantially the same length, but considerably smaller in diameter, this inner member being spaced from the outer by means of a ball bearing carrying sleeve 8. The latter surrounds the inner member 7 and has a plurality of seats formed therein in which bearing balls 9 are positioned. This sleeve is of such a length that it will effectively space the two members regardless of the distance the inner member projects beyond one end of the other.

An enlarged cylindrical head 10 is disposed at each end of the inner member 7, each of said heads having a shank 11 extending therefrom and projecting within said member, pins 12 being passed through both the member 7 and the shanks 11 to lock the heads in position. Knobs or the like 13 are formed on the opposite ends of the heads to give the device a neat appearance and at the junction of the heads and the shanks thereof shoulders 14 are formed. The diameter of these heads is also somewhat less than the inner diameter of the outer tubular member 1 so that they will freely slide therethrough.

Caps 15 are attached to the ends of the outer tubular member 1, the ends of said caps having circular openings 16 of a diameter substantially similar to the diameter of the heads 10 which are normally disposed therein. These openings 16, it will be seen, are smaller than the inner diameter of the tubular member so that shoulders 17 are formed, the purpose of which will be hereinafter pointed out. Each of the caps is longitudinally slotted as shown at 18 to receive a dog or cam 19 which is pivoted therein. Each of these cams extends into the adjacent opening 16 and normally rests in a groove 20 in the adjacent head 10. These grooves are such a depth that the inner ends of the cams do not engage their bottoms and therefore, do not interfere with the outward movement of the inner member.

Since the inner member 7 is free to slide within the outer, means are provided for holding it as shown in Figs. 2 4 and 5 except when the safety of the vehicle requires that it be extended. The means for holding the inner member within the outer consists of a spring pressed detent 21 which is disposed in a casing 22 and is slidable through an opening in the member 1 to a seat in the member 7. This detent is moved outwardly against the tension of its spring by means of a lever 23 mounted in the vehicle within the reach of the operator. Connecting rods 24 extend from this lever to the detents in the front and rear bumper bars so that they may be simultaneously operated to release the inner members.

Assuming that occasion has arisen for the operation of the safety device because of the dangerous tilting of the vehicle, the lever 23 is actuated in the proper direction to release the detents 21 whereupon the inner members 7 will slide out of the outer members in the proper direction due to the action of gravity, their outward movement being assisted by means of the ball bearings. The inner members will continue to slide outwardly until their outer ends engage the ground or their outward movement is limited by the engagement of the sleeves with the shoulders 14 and 17. It will be readily noted that these bearing carrying sleeves 8 will limit the outward movement of the inner member in either direction.

After the inner members have slid outwardly a sufficient extent, the cams 19 on the side of the machine closest the ground, will come into operation and will prevent the inner members from sliding back into the outer members. In other words, the cams will bind against the inner members as shown at Fig. 6. Thus, these inner members will hold the vehicle against completely overturning. After the machine has been righted, the inner members may be slid back into the outer members upon the release of the cams 19.

From the foregoing description taken in connection with the accompanying drawings, it will be readily noted that a much improved arrangement of parts has been provided which will effectively prevent many serious accidents due to automobiles and other vehicles running into ditches at the sides of roadways. The safety devices are practically automatic in their operation after the detents 21 are released.

I claim:—

1. A safety device comprising an open-ended tubular member to be secured to a vehicle, a shoulder extending into each opening in said member, a bar slidable in and normally disposed in said member, enlarged heads on the ends of said bar, a bearing carrying sleeve surrounding said bar to engage either of said shoulders and heads to limit the outward movement of the bar, and means for holding said bar in extended position.

2. A safety device comprising an outer tubular member, an inner member of less diameter than the outer member and slidable therein, enlarged heads on the ends of said inner member also of less than the inner diameter of the tubular member, caps on the ends of the outer member, each having an opening therein to receive said heads, a sleeve surrounding the inner member within the outer member and spacing the former from the latter, said sleeve having a plurality of seats, a plurality of bearing members in said seats, and means for holding the inner member in extended position.

3. A safety device comprising an outer tubular member, an inner tubular member of less diameter than the outer member and slidable therein, enlarged heads on the ends of said inner member and also of less than the inner diameter of the tubular member, shanks extending from said heads into the ends of said inner member, caps on the ends of the outer tubular member, each having an opening therein to receive said heads, a sleeve surrounding said inner member within the outer member and spacing the former from the latter, and means for holding said inner member in extended position.

4. A safety device comprising an outer tubular member, an inner member of less diameter than the outer and slidable therein, enlarged heads on the ends of the inner member, each of said heads having a longitudinally extending groove, means for spacing the inner member from the outer member, and a cam carried by each end of the outer member, either being adapted to engage the inner member when extended, said cams being normally disposed in said grooves.

5. A safety device comprising an outer tubular member, an inner member of less diameter than the outer member and slidable therein, enlarged heads on the ends of the inner member, each of said heads having a longitudinally extending groove, a cap on each end of the outer member having an opening therein to receive the adjacent head, said caps also being longitudinally slotted, means for spacing the inner member from the outer member, and a cam carried by each of said caps within its slot, either of said cams being adapted to engage the inner member when extended, said cams being normally disposed in said grooves.

In testimony whereof I have hereunto set my hand in the presence of two subscribing witnesses.

EDWARD C. SHILLING.

Witnesses:
R. S. SWEPSTON,
FRANK WILSON.

Copies of this patent may be obtained for five cents each, by addressing the "Commissioner of Patents, Washington, D. C."